United States Patent Office 3,113,121
Patented Dec. 3, 1963

3,113,121
POLYESTER RESIN STABILIZED WITH m-BIS (12-HYDROXY-4-METHOXY BENZOYL) BENZENE
Paul E. Hoch, Youngstown, N.Y., and Richard J. Bellet, Mountain Lakes, N.J., assignors to Hooker Chemical Corporation, Niagara Falls, N.Y., a corporation of New York
No Drawing. Filed May 8, 1959, Ser. No. 811,793
3 Claims. (Cl. 260—45.4)

This invention relates to new and improved light stabilizers and particularly light stabilizers effective against degradation caused by the absorption of ultraviolet light. This invention further relates to methods for the production of such light stabilizers. The invention further relates to polymeric resins incorporating such light stabilizers.

One of the disadvantages of present commercially available ultraviolet screeners or light stabilizers is that their specific extinction coefficient ($k$) in the ultraviolet range between three hundred to four hundred millimicrons is too low. It is accordingly an object of this invention to find and produce light stabilizers having higher $k$ values than such present commercially available light stabilizers.

We have found that the foregoing disadvantage of the prior art screeners may be overcome and the desired objects of this invention obtained by producing light stabilizers having the following formula:

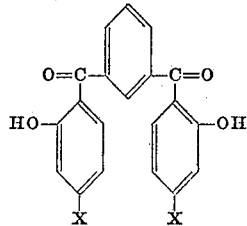

wherein each X is selected from the group consisting of hydroxyl and alkoxy radicals.

A further advantage of the screeners of the present invention over the screeners of the prior art is that because of the meta substitution on the central ring of the screeners of the present invention, there is no electronic interaction between the two chromophoric groups and hence no greater absorption in the visible range of the spectrum.

We have further found that such stabilizers may be produced by reacting a material such as isophthaloyl chloride with a substituted phenol such as resorcinol dimethyl ether. When the two foregoing materials are used as starting materials, the reaction product is m-bis(2-hydroxy-4-methoxy benzoyl) benzene, which has the formula:

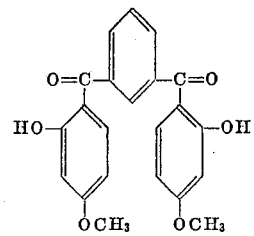

The following examples are set forth to further illustrate the teachings of this invention:

*Example 1.—The Preparation of m-Bis(2-Hydroxy-4-Methoxy Benzoyl) Benzene*

One hundred one and five-tenths grams of isophthaloyl chloride was dissolved in 600 milliliters monochlorobenzene. To this was added 133.3 grams aluminum chloride from a powder hopper. One hundred thirty-eight and two-tenths grams resorcinol dimethyl ether was added dropwise.

The reaction mixture was heated until no more gas came off, then was cooled and hydrolyzed by pouring over ice and dilute acid. The solvent was steam distilled off and the product recrystallized. Recovery was 65.5 grams pale yellow crystals, melting at 166 to 167 degrees centigrade, and having the following formula:

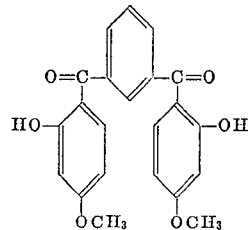

*Analysis.*—Calc'd for $C_{29}H_{18}O_6$: C, 69.90; H, 4.76. Found: C, 69.95; H, 4.95.

Examples 2 and 3 serve to illustrate the use of stabilizers of the present invention and the improvements resulting therefrom.

In order to allow for consistent and uniform results so that comparisons could be made, the following procedure was used for evaluating weather resistance. One-ply polyester glass fiber laminates (Owens-Corning Fiberglas Corporation Mat No. 216B) containing about 30 percent by weight glass and about 70 percent by weight resin were exposed in Miami, Florida. These panels were exposed by the standard dry land method, that is, 45 degrees to the vertical facing south twenty-four hours per day.

*Example 2.—Resin Preparation*

An unsaturated polyester resin was prepared by esterifying about 53 parts of ethylene glycol and 90 parts of diethylene glycol with about 395 parts of 1,4,5,6,7,7-hexachlorobicyclo-(2.2.1)-5-heptene-2,3-dicarboxylic anhydride (which was prepared by the Diels-Alder reaction of hexachlorocyclopentadiene with maleic anhydride) and about 71 parts of maleic anhydride. About 30 parts of styrene and about 100 parts of product produced by the esterification reaction were mixed together until complete solution was attained to give a clear, substantially colorless solution of liquid polyester resin having a viscosity of about 30 poises at 25 degree centigrade on a Gardner bubble viscometer and having a chlorine content of about 30 percent by weight of the total.

*Example 3*

To 100 parts of the unsaturated polyester resin prepared in Example 2 was added one part of m-bis(2-hydroxy-4-methoxy benzoyl) benzene. A glass laminate was prepared in accordance with the aforementioned method and the resulting mixture polymerized, in the presence of a catalyst consisting of about 2 percent by weight of a mixture containing 50 percent by weight of benzoyl peroxide in tricresyl phosphate, by heating to a temperature of about 95 degrees centigrade for about twenty minutes on an open bed hydraulic press and twelve hours at 80 degrees centigrade in a forced draft oven.

The laminate thereby obtained was exposed outdoors for three months in the manner described above in Miami, Florida, after which time the surface showed only slight discoloration and no surface erosion. A control prepared in the same manner but containing no light stabilizer showed marked discoloration and severe surface erosion.

It is to be understood that the invention is not limited to the specific examples which have been offered merely

We claim:
1. A composition of matter having the formula:

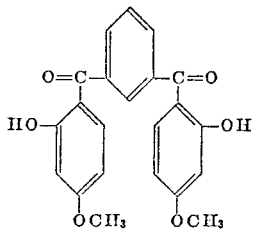

2. A composition of matter comprising (1) an unsaturated polyester resin comprised of the esterification product of a polyhydric alcohol and the Diels-Alder reaction product of hexachlorocyclopentadiene and maleic anhydride, and (2) the composition of claim 1.

3. The composition according to claim 2 when copolymerized with styrene.

References Cited in the file of this patent

UNITED STATES PATENTS

| | | |
|---|---|---|
| 2,794,052 | Gordon et al. | May 28, 1957 |
| 2,824,854 | Gordon | Feb. 25, 1958 |
| 2,890,193 | Hardy | June 9, 1959 |
| 2,890,201 | Hardy | June 9, 1959 |

FOREIGN PATENTS

| | | |
|---|---|---|
| 573,629 | Belgium | Dec. 5, 1958 |